US010235814B2

(12) United States Patent
Romdhani

(10) Patent No.: US 10,235,814 B2
(45) Date of Patent: Mar. 19, 2019

(54) METHOD FOR GENERATING A THREE-DIMENSIONAL FACIAL MODEL

(71) Applicant: MORPHO, Issy-les-Moulineaux (FR)

(72) Inventor: Sami Romdhani, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 311 days.

(21) Appl. No.: 14/646,009

(22) PCT Filed: Nov. 20, 2013

(86) PCT No.: PCT/EP2013/074310
§ 371 (c)(1),
(2) Date: May 19, 2015

(87) PCT Pub. No.: WO2014/079897
PCT Pub. Date: May 30, 2014

(65) Prior Publication Data
US 2015/0310673 A1    Oct. 29, 2015

(30) Foreign Application Priority Data

Nov. 20, 2012  (FR) .................................... 12 61025

(51) Int. Cl.
*G06T 19/20*    (2011.01)
*G06K 9/00*    (2006.01)
(Continued)

(52) U.S. Cl.
CPC .......... *G06T 19/20* (2013.01); *G06K 9/00275* (2013.01); *G06T 3/0043* (2013.01);
(Continued)

(58) Field of Classification Search
None
See application file for complete search history.

(56) References Cited

U.S. PATENT DOCUMENTS

| 7,082,212 B2* | 7/2006 | Liu ..................... G06K 9/00201 375/E7.084 |
| 2003/0012408 A1* | 1/2003 | Bouguet ............ G06K 9/00228 382/103 |

(Continued)

FOREIGN PATENT DOCUMENTS

| EP | 1 039 417 | 9/2000 |
| WO | WO-99/64961 | 12/1999 |
| WO | WO-2012/126135 | 9/2012 |

OTHER PUBLICATIONS

Goturk et al, "A Data-Driven Model for Monocular Face Tracking", Proc. ICCV, pp. 701-708, 2001.*

(Continued)

*Primary Examiner* — Kee M Tung
*Assistant Examiner* — Patrick F Valdez
(74) *Attorney, Agent, or Firm* — Womble Bond Dickinson (US) LLP

(57) ABSTRACT

The invention relates to a method for generating a three-dimensional facial model the shape of which can changed on the basis of a plurality of images of faces of persons, including the steps that involve: generating a facial template; acquiring shapes from examples of faces of persons; repeatedly changing the shape of the template for each example of a face of a person, so that the shape of the changed template corresponds to the shape of the face example, and determining the change in shape between the initial template and the changed template; and generating the facial model as a linear combination of the shape of the template and the changes in shape between the initial template and the changed template, for each example of a face of a person. The invention also relates to a method for processing an (Continued)

image of a face of a person such as to generate a three-dimensional image of the face of the person from of said deformable model.

7 Claims, 5 Drawing Sheets

(51) Int. Cl.
    *G06T 3/00*    (2006.01)
    *G06T 15/04*    (2011.01)
    *G06T 17/10*    (2006.01)
    *G06T 7/33*    (2017.01)

(52) U.S. Cl.
    CPC .............. *G06T 7/337* (2017.01); *G06T 15/04* (2013.01); *G06T 17/10* (2013.01); *G06T 2207/30201* (2013.01); *G06T 2219/2021* (2013.01)

(56) References Cited

U.S. PATENT DOCUMENTS

| | | | |
|---|---|---|---|
| 2005/0031195 A1 | 2/2005 | Liu | |
| 2007/0258645 A1* | 11/2007 | Gokturk | G06K 9/00288 382/190 |
| 2009/0180672 A1* | 7/2009 | Ishiyama | G06K 9/00268 382/118 |
| 2010/0066822 A1* | 3/2010 | Steinberg | G06K 9/00208 348/77 |
| 2013/0201187 A1* | 8/2013 | Tong | G06T 17/00 345/420 |

OTHER PUBLICATIONS

Liu et al, "Rapid modeling of animated faces from video", The Journal of Visualization and Computer Animation, vol. 12, pp. 227-240, 2001.*
Knothe et al, "Morphable Models of Faces", Ch. 6, Handbook of Face Recognition, Springer-Verlag, Aug 2011.*
Schneider et al, "Algorithms for Automatic and Robust Registration of 3D Head Scans", Journal of Virtual Reality and Broadcasting 7.7, pp. 1-15, 2010.*
Basso et al, "Regularized 3D Morphable Models", Proc. of the First IEEE International Workshop on Higher-Level Knowledge in 3D Modeling and Motion Analysis (HLK'03), 2003.*
Tena et al, "2D Face Pose Normalisation Using a 3D Morphable Model", IEEE Conf. Advanced Video and Signal Based Surveillance (AVSS 2007), pp. 51-56, Sep. 2007.*
Blanz et al, "A Morphable Model for the Synthesis of 3D Faces", SIGGRAPH'99, pp. 187-194, 1999.*
Blanz et al, "Face recognition based on fitting a 3D morphable model", IEEE Trans. on Pattern Analysis and Machine Intelligence (PAMI), 25(9), pp. 1063-1074, Sep. 2003.*
Blanz et al, "Face Recognition Based on Fitting a 3D Morphable Model", IEEE Trans. on PAMI, 25(9), Sep. 2003.*
Guillemaut et al, "General Pose Face Recognition Using Frontal Face Model", CIARP, vol. 4225, pp. 79-88, 2006.*
Eveno, Nicolas, "Segmentation des lèvres par un modèle déformable analytique—PhD Thesis," (Nov. 14, 2003), p. 58, with brief English explanation of the relevance of the reference.

* cited by examiner

METHOD FOR GENERATING A THREE-DIMENSIONAL FACIAL MODEL

FIELD OF THE INVENTION

The field of the invention is that of the processing of images of faces of individuals, for generating a frontal view of an individual from a non-frontal image of the latter.

The invention applies especially to the identification of individuals by facial recognition.

PRIOR ART

Identification of individuals by facial recognition is carried out by comparing two face images, and by deducing from this comparison a score evaluating the resemblance between the faces featured on the images.

When the compared faces fail to appear on the image with the same pose, the resemblance score can be substantially degraded, even if the faces featured on the images come from the same person. This results in a considerable loss of efficacy of the identification methods conducted, since the pose of the face on the images is not the same.

The optimal recognition efficacy is therefore obtained not only when two faces have the same pose on the compared images, but when the faces are seen in front view, as this view provides most information on the shape of the face.

But it is impossible to systematically obtain a facial image of a face for identification. In fact, in most situations a previously recorded facial image of an individual, such as for example in an identity document, is compared to an image of the individual acquired "on the fly" by an acquisition system such as a surveillance camera. The image acquired this way is practically never a facial image, as the individual is not looking at the acquisition system.

In this case, treatment methods of images have been developed to generate, from an image of a face, an image of the same face, seen in front view.

For this, the acquired image is treated to determine the three-dimensional shape of the face of the individual on the image, its pose, that is, its position relative to a frontal view, and a representation of the texture of the face, that is the physical appearance of the surface of the face superposed on the three-dimensional structure of the shape of the face.

Determination of the three-dimensional shape of the face of the individual is per se carried out by deformation of a deformable three-dimensional model of a human face to minimise the difference between characteristic points of the model (position of eyes, nostrils, nose tip, corners of lips, etc.) and the corresponding points of the face on the image.

Different types of three-dimensional facial models have already been proposed. The publication *A Morphable Model For the Synthesis of 3D Faces*, V. Blanz, T. Vetter, Maxi-Plancki-Institute für Biologische Kybernetik, discloses for example a model of a three-dimensional face generated from examples of faces of an individual, whereof the characteristic points have been placed in correspondence, and on which statistical analysis called "analysis in principal components" has been conducted. This analysis is based on a particularly restrictive hypothesis, according to which the shapes of the human faces present a Gaussian density of probability.

This hypothesis is not proven, therefore the model of a face generated in this way probably cannot be used to generate any human face.

PRESENTATION OF THE INVENTION

The aim of the invention is to propose a treatment method of a facial image of an individual not having the disadvantage mentioned hereinabove, and especially determining the shape of any human face featured on an image.

In this respect, the aim of the invention is a method for generating a model of deformable three-dimensional face from a plurality of images of faces of individuals, the method being characterized in that it comprises the steps consisting of:
  generating a facial template,
  acquiring shapes of examples of faces of individuals,
  for each example of a face of an individual, repeatedly deforming the template so that the shape of the deformed template corresponds to the shape of the example of a face, and determining the deformation between the initial template and the deformed template, said repeated deformation of the template comprising minimisation of the derivative of the difference between the initial template and the deformed template, to constrain the deformed template to remaining a shape of a human face, and
  generation of the model of a face as a linear combination of the shape of the template and the deformations between the initial template and the deformed template for each example of a face of an individual.

Advantageously, but optionally, the method according to the invention also has at least one of the following characteristics:
  acquisition of shapes of examples of faces of individuals comprises the detection of characteristic points of each example of a face of individuals, and correspondence of the characteristic corresponding points between the examples of faces,
  repeated deformation of the template comprises, for each example of a face of an individual, the modification of the positions of the characteristic points of the template to minimise a difference in position between said characteristic points and the corresponding points of the example of a face of an individual,
  repeated deformation of the template further comprises minimisation of a difference in position between the points of the template and the surface of the example of a face,
  the step of repeated deformation of the template comprises repeated minimisation of a linear combination of:
    the difference in position between the characteristic points of the example of a face and the corresponding points of the template,
    the derivative of the difference between the initial template and the deformed template, and
    a difference in position between the points of the template and the surface of the example of a face, and the coefficients of the linear combination vary from one repetition to the other.

The invention also proposes a treatment method of at least one facial image of an individual, comprising the steps consisting of generating, from the image, a three-dimensional representation of the face of the individual, said representation comprising the steps consisting of:
  determining a draft of the pose of the face of the individual on the image by comparison between positions of characteristic points of the face of the individual and positions of corresponding points of a shape of a reference human face,
  determining the shape and the pose of the face of the individual on the image by repeatedly deforming a three-dimensional model obtained by executing the method for generating a model of a face according to the invention, so that the shape of the deformed model corresponds to the shape of the face of the individual on the image, deformation of the three-dimensional model being carried out by modification of the coefficients of the linear combination of the model, the method being characterized in that the modifications of the coefficients of the linear combination are restricted to ensure that the deformed model corresponds to a human face.

Advantageously, but optionally, the treatment method of a facial image further comprises at least one of the following characteristics:

the modifications of the coefficients of the linear combination are restricted by minimisation of the standard of the derivative of the difference between the model initial and the deformed model, the pose and the shape of the face of the individual on the image are estimated simultaneously, by repeated modification of the pose and of the shape of the three-dimensional model to minimise the difference between the characteristic points of the face of the individual on the image and the corresponding points of the model, the modification of the pose of the model comprises at least one transformation from the group preceding: translation, rotation, change in scale, the modification of the shape of the three-dimensional model comprises determination of the coefficients of the linear combination between the facial template and the deformations applied to the template to obtain each example of a face, the method further comprises the steps consisting of:
from estimation of the pose and the shape of the face of the individual on the image generating a representation of the texture of the face of the individual, and generating a frontal view of the face of the individual.

The method is carried out on a plurality of face images of an individual, and:

the step for determination of a draft of the pose of the face of the individual is carried out on each facial image of the individual, and the step for determination of the shape and the pose of the face of the individual is carried out on all the face images by repeatedly deforming the three-dimensional model so that the shape of the deformed model corresponds to the shape of the face of the individual on the images.

The invention finally proposes a system for identification of individuals comprising at least one control server of an individual to be identified, and at least one management server of a base of N reference images of indexed individuals, the control server comprising acquisition means adapted to execute acquisition of an image of the face of the individual, the system for identification of individuals being characterized in that one of the control server and the management server comprises processing means adapted to execute the treatment method according to the invention, and from a frontal view of the face of an individual obtained, carry out treatment of facial recognition by comparison with the reference images of the base to identify the individual.

DESCRIPTION OF FIGURES

Other characteristics, aims and advantages of the present invention will emerge from the following detailed description with respect to the appended figures, given by way of non-limiting examples and in which:

FIG. 5d is a facial image of the face of the individual reconstructed from the image of FIG. 5a.

DETAILED DESCRIPTION OF AT LEAST ONE EMBODIMENT OF THE INVENTION

Treatment System of Images

Figure 1:
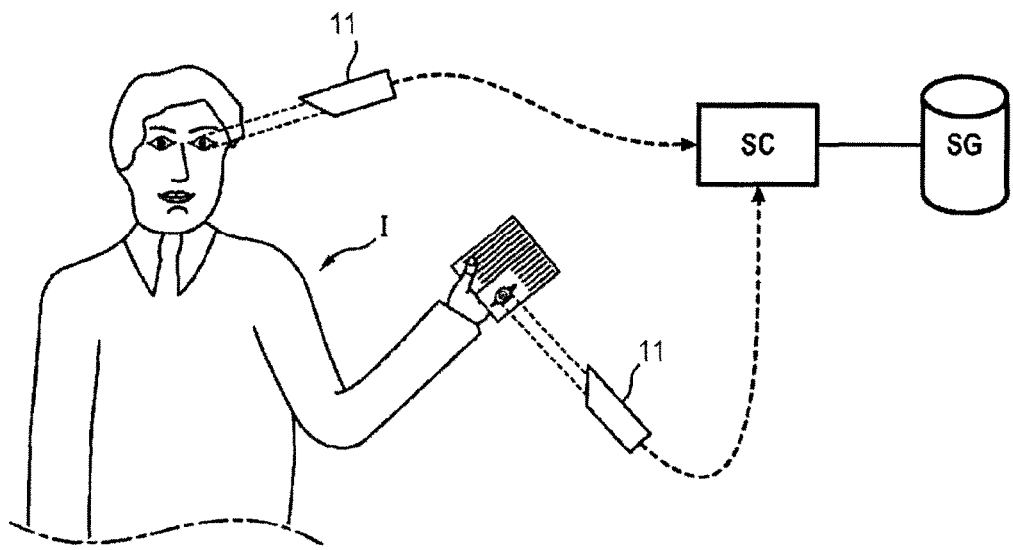
FIG. 1 illustrates an example of an identification system adapted to execute a treatment method of images.

In reference to FIG. 1, this shows an identification system 1 adapted to execute a treatment method of images. During identification of an individual I, a control server SC fitted with appropriate acquisition means 11 of images performs acquisition of an image of the face of the individual.

This image can be non-frontal. To identify the individual I, the control server SC can also acquire a facial image of the individual, frontal this time, which is stored in an identity document.

The control server advantageously comprises processing means adapted to execute, on the first image of the face of the individual, treatment aimed at "frontalising" this image: that is, generating from this image a frontal image. Following this frontalisation treatment, the control server can advantageously compare the two frontal images it has to determine whether the faces featured on the images correspond to the same person.

Alternatively, the second facial image can be stored among other images in a database of a management server SG. The control server transmits the first image it has acquired to the management server and the latter runs the treatment method of the first image and comparison to identify the individual I. In this case, the comparison can take place between the "frontalised" image of the individual and each of the face images recorded in the database.

Treatment Method of Face Images

Figure 2A:
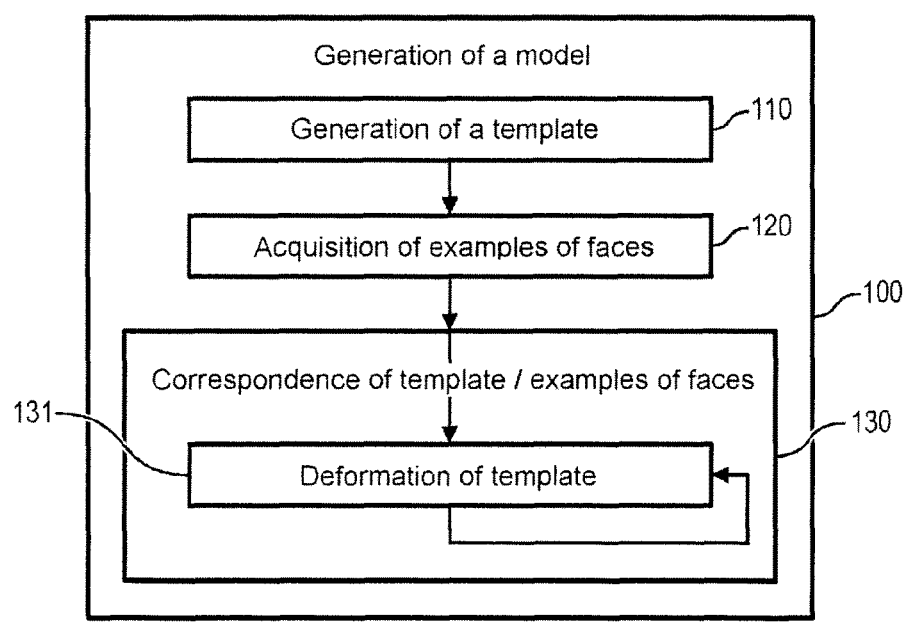
FIG. 2a illustrates the principal steps of the method for generation of a three-dimensional model of a face.
Figure 2B:
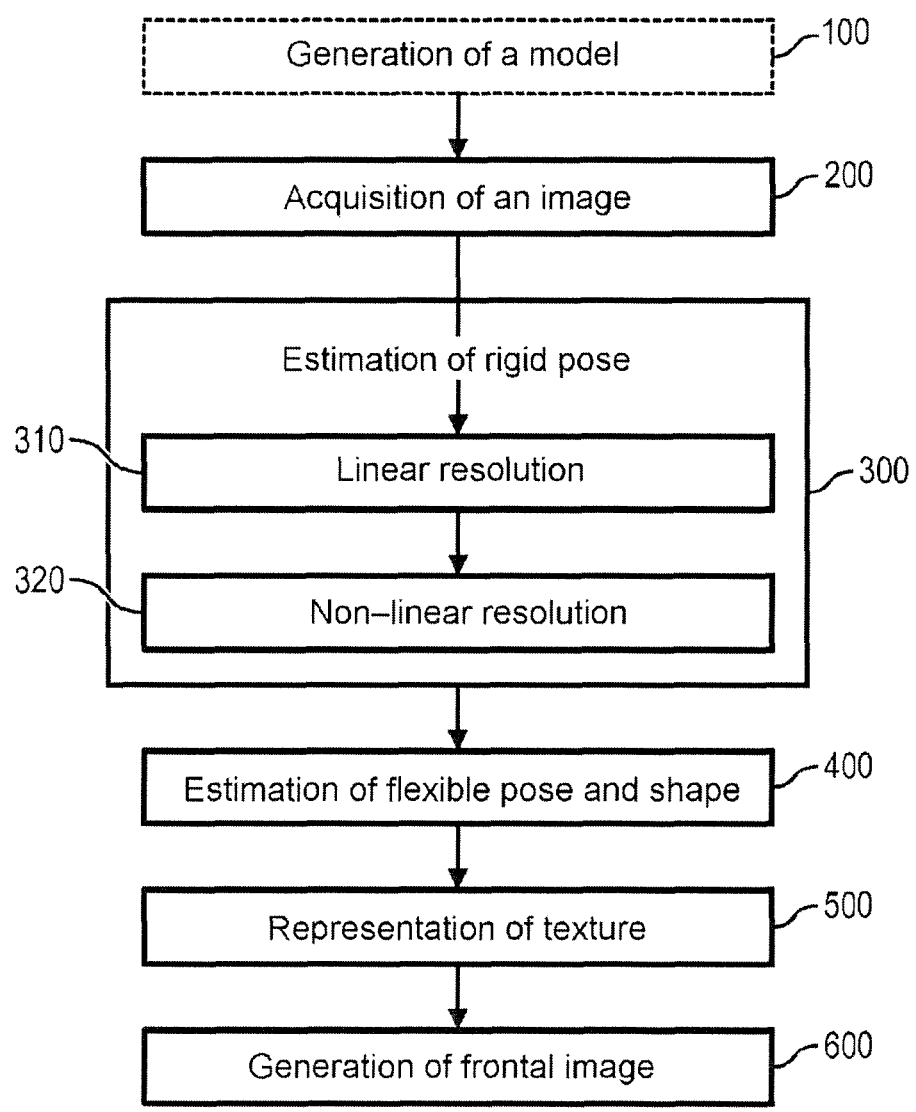
FIG. 2b illustrates the principal steps of the treatment method of images according to the invention.

In reference to FIG. 2, a treatment method of face images, for obtaining a frontal image of a face of an individual is described.

In computer sciences, each three-dimensional object such as a human face can be described by means of the following three elements:

The shape of the object, which is composed of a 3D vertex set, each vertex being a point of the object defined by coordinates along three orthogonal directions. N is the number of vertices vi of an object, each object being described by a dimension matrix $3 \times N$ $S=(v_1, \ldots, v_N)$ in which the vertices are arranged in columns.

The surface of the object: it is embodied by joining together vertices to form triangles. A list of triangles is therefore defined for each object, each triangle being indicated by the three indices of the corresponding columns of the matrix S.

A representation of the texture of the object: this is an image used to colour the three-dimensional object obtained from its shape and from its surface. The surface of the object defined by the list of triangles is used to have the vertex of the object correspond to a particular texture.

Generation of a Deformable 3D Model

The method comprises a first step 100 consisting of generating a three-dimensional model of a shape of a human face, which can be deformed to obtain any type of shape of a human face.

This model is formulated mathematically as a linear combination of examples of faces of individuals, noted $$S = S^0 + \sum_{j=1}^{M} \alpha_j S^j$$

where $S^0$ is a template of the shape of a human face, constituting the base of the model, and $S^0+S^j$ illustrates the shape of the face of a particular example of as real individual. As a consequence, $S^j$ illustrates the difference between one of the examples of faces and the template.

The coefficients $\alpha_j$ are as such determined later to deform the model S to have it correspond to the face of an individual to be identified.

The steps for obtaining this model will now be described.

Figure 3:
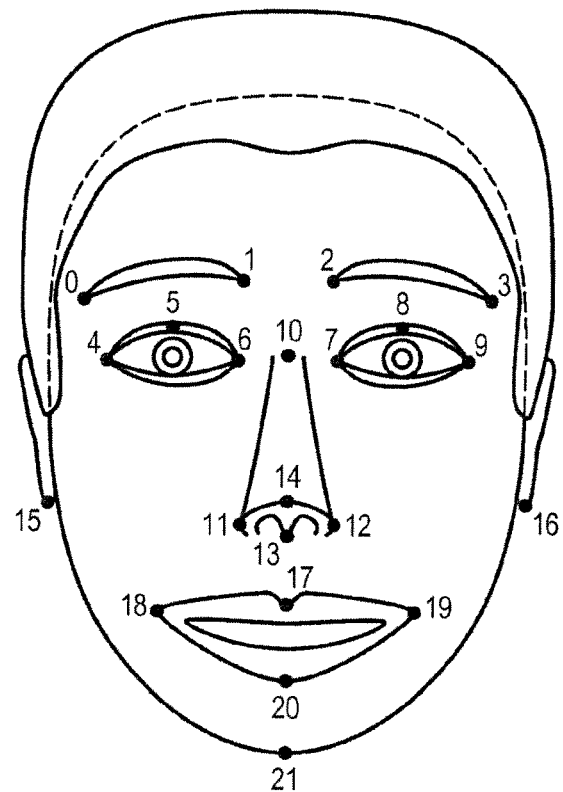
FIG. 3 illustrates the characteristic points of a face.

During a step 110, the template $S^0$ of a human face is generated: it can be a shape of a face of a particular individual, or an average of shapes of faces of a plurality of individuals. In all cases, the shape or shapes of faces is defined by a series of vertices corresponding to points of the face. These points comprise, inter alis, a number $N_s$ of characteristic points of a face, represented in FIG. 3, typically 22, and which are the corners of the eyes, the ends of the mouth, nostrils, the tip of the nose, ears, etc.

These characteristic points can be marked manually by an operator from a frontal face image, or they can be marked automatically by a server.

The template of a human face further comprises of the order of a few thousand other vertices acquired by a 3D scanner.

During a step 120, acquisition of shapes of examples of faces of real individuals is carried out. This acquisition is carried out in the same way as previously, by marking the characteristic points of the faces of the individuals for generating a list of vertices.

The shapes of faces acquired in this way each correspond to a $S^0+S^j$. To construct the three-dimensional model, the deviation Si between the face and the template is determined from the lists of vertices of each shape of a face.

All the shapes generated by the three-dimensional model S have to be possible shapes of faces, and not mathematical aberrations. To ensure this result, all the examples of shapes of faces are placed in correspondence, that is, by linking each vertex of a face to a defined number. For example, a given number at the end of the nose and another number on the left corner of the lips are attributed. These numbers correspond to the indices of the vertices.

The particular feature of the template it is that it is a shape of a face for which indexation of the vertices is already completed. Consequently, indexation of the vertices of each example of the shape of a face is carried out by placing into correspondence during a step 130 the vertex of each example of the shape with the vertex of the template.

To do this, during a step 131 the template is repeatedly deformed to minimise the difference between the shape of the template and that of the example of a face, the deformed template always having to correspond to a shape of a human face.

The mathematical function to be minimised comprises three terms.

The first term serves to minimise the distance between the characteristic points of an example of a face and the corresponding points of the template. It is written as:

$$\sum_{i=1}^{N_s} \|s_i - v_i\|^2$$

where i is the index of a characteristic point, $S_j$, is a vertex of a point of a face of an example of an individual corresponding to the characteristic point i, $v_{ki}$ is a vertex of a point of the template after deformation corresponding to the same characteristic point i, and $N_s$ is the number of characteristic points in a face, such as 22.

The aim therefore is to modify the positions of characteristic points of the template repeatedly to correspond to the positions of the same characteristic points on the example of a face.

The second term serves to place in correspondence the surface of the shape of the face of the template with the surface of the shape of the example of a face. The function to be minimised illustrates the difference between the points of the template and the surface of the example of a face which is the closest to the characteristic points. It is noted as:

$$\sum_{i=1}^{N} \|p_{v_i} - v_i\|^2$$

where $p_{v_i}$ is a point of the surface of the example of a face, that is, a point corresponding to the projection on the surface of the face of the vertex $v_i$. It is possible that the surface of the example of a face is incomplete, if for example it is obtained from a non-frontal image, and that points of the template correspond to no point of the example of a face. In this case, these points of the template are not considered.

The third term constrains the deformed template to remain a real human face, even if the example of a face used for deformation of the template is incomplete or contains noise. This term makes the deformed template the "smoothest" possible, that is, the most continuous possible by minimising the standard of the derivative of the transformation of the template at each repetition. This standard is expressed as follows:

$$\|A(v-\text{vec}(S^0))\|^2$$

where v is the concatenation of the 3D vertices of the deformed template, and $\text{vec}(S^0)$ the same term for the template prior to transformation, v and $\text{vec}(S^0)$ are size vectors 3N×1.

As the derivation of a function is a linear operation, its calculation can be done by multiplication of the function by a matrix. In this case, A is a differentiation matrix of the vector $v-\text{vec}(S^0)$, of dimensions 3T×3N, where T is the number of triangles of the surface of the template.

The derivative is calculated for each triangle t of the surface of the template, the derivative of the deformation of a triangle t being calculated relative to the triangles q near the triangle t, by approximation of the finished difference of the triangle t with the adjacent triangles q as follows:

$$\sum_{q \in N_t} w_{q,t} \frac{d_q - d_t}{\|b_q - b_t\|}$$

where $N_t$ is all the triangles q near the triangle t, $w_{q,t}$ is a weighting factor which depends on the surfaces of the triangles t and q, $d_t$ is the deformation of the triangle t at the level of its barycentre, and $b_t$ is the position of the barycentre of the triangle t. The distance between the barycentres and the weighting factor are calculated on the non-deformed template $S^0$.

Figure 4:
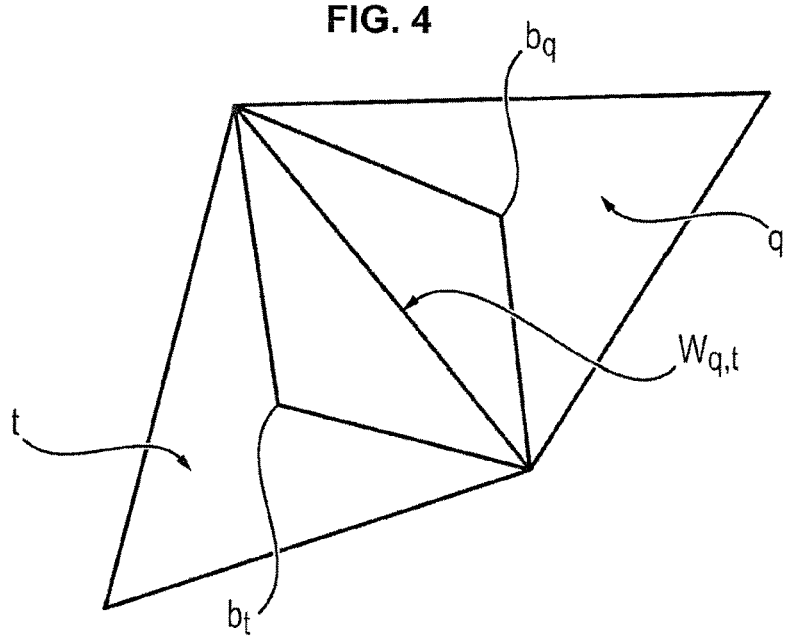
FIG. 4 illustrates notations used for calculation of a differentiation matrix.

In reference to FIG. 4, the weighting factor $w_{q,t}$ is the sum of the surfaces of two triangles whereof the base is the ridge connecting the triangles t and q, and the apex opposite this base is respectively the barycentres $b_t$ of the triangle t and that of $b_q$ of the triangle q.

To obtain deformation $d_t$ of the triangle t at the level of its barycentre (that is, displacement of the barycentre between the non-deformed template and the deformed template), the deformation of the shape (v–vec($S^0$)) is multiplied by a matrix $B_t$ of dimension 3×3N which is zero everywhere except on the elements associated with the vertices of the triangle t. These elements are equal ⅓.

Since the barycentre $b_t$ of the triangle t is the average of its three vertices, multiplication of this matrix B by the deformation (v–vec($S^0$)) produces displacement of the barycentre of the triangle.

The matrix A, of dimension 3T×3N, is obtained by concatenating vertically all the matrices $B_t$ associated with each triangle t, the coefficients of which corresponding to the vertices of a triangle t are multiplied by the weighting factors $w_{q,t}$ and divided by the distances between the barycentres $\|b_q - b_r\|$ It is evident that the differentiation matrix A depends solely on the surface of the non-deformed template (list of triangles of $S^0$), and not on the shape of the deformed template v. It is therefore constant.

Because the three terms described in detail hereinabove are minimised simultaneously, the following is determined therefore:

$$\min_v \sum_{i=1}^{N_s} \|s_i - v_i\|^2 + \kappa \sum_{i=1}^{N} \|p_{v_i} - v_i\|^2 + \gamma \|A(v - vec(S^0))\|^2$$

where $\kappa$, and $\gamma$ are weighting coefficients of each term. This minimisation can be resolved linearly by decomposition into singular values.

As this minimisation is repeated, at the start of correspondence, the template can be arbitrarily removed from the example of a face of the individual, and therefore the points $p_{v_i}$ of the surface of the face closest to the points $v_i$ of the template are not well defined. A low value for $\kappa$ is fixed comparatively to the other weighting coefficients. Also, a considerable value for $\gamma$ is fixed to ensure that the transformation is quasi-rigid, that is, the shape of the face of the template is the least deformed possible.

At each repetition of the minimisation, the value of $\kappa$ is increased. At each repetition, the points $p_{v_i}$ are searched for on the surface of the example of a face of an individual, as being the closest to the points $v_i$ of the deformed template to this repetition. As minimisation is repeated, these points $p_{v_i}$ are weaker and weaker and the value of the coefficient $\gamma$ is diminished to make comparison more flexible.

This repeated correspondence step is conducted for each example of a face of an individual. It ends with a deformed template, which corresponds to an example of a face, and from which the value of $S^j$ can be deduced, the deviation between the template and the example of a face.

On completion of this step this therefore produces a deformable model of a three-dimensional face, comprising the template $S^0$ and the deviations $S^j$ from which linear combinaitds can be made to obtain any face of an individual.

Once this model is obtained, it can be used to generate a three-dimensional shape of the face from a facial image of an individual.

Figure 5A:
FIG. 5a is an image of a face to be treated to identify the individual in the image.

Back to FIG. 2, during a step 200 an image of the face of an individual is acquired which is to be identified, for example by means of a control server of FIG. 1. An example of such an image is appended in FIG. 5a.

Then, a so called "rigid" estimation step 300 of the pose, or position, of the face on the image is carried out. The estimation is called rigid as it comprises no deformation of the face.

The pose is defined relatively to a reference, by using six parameters: three angles of rotation, two translation parameters and a factor of scale and is defined as:

$$p = s \cdot R - v + t$$

where p is a two-dimensional vector, comprising coordinates in X and Y of the projection of each three-dimensional vertex v, s is the parameter of scale, R is a matrix of type 2×3 whereof the two lines are the two first lines of a matrix of rotation, and t is a translation vector in X and Y.

The matrix of rotation is expressed as a function of the Euler angles $a_x$, $a_y$, and $a_z$ as follows:

$$R = \begin{pmatrix} 1 & 0 & 0 \\ 0 & 1 & 0 \end{pmatrix} \begin{pmatrix} 1 & 0 & 0 \\ 0 & \cos(\alpha_x) & \sin(\alpha_x) \\ 0 & -\sin(\alpha_x) & \cos(\alpha_x) \end{pmatrix}$$
$$\begin{pmatrix} \cos(\alpha_y) & 0 & -\sin(\alpha_y) \\ 0 & 1 & 0 \\ \sin(\alpha_y) & 0 & \cos(\alpha_y) \end{pmatrix} \begin{pmatrix} \cos(\alpha_z) & -\sin(\alpha_z) & 0 \\ \cos(\alpha_z) & \sin(\alpha_z) & 0 \\ 0 & 0 & 1 \end{pmatrix}$$

To estimate the pose, the positions of the characteristic points of the face of the individual on the image are acquired in the same way as previously, for example by pointing an operator or by automatic detection. In this respect, reference could be made to following publications:

Yow et al. *Feature-based human face detection*. Image and Vision Computing, 15(9): 713-735, 1997.

Nikolaidis and Pitas, *Facial feature extraction and determination of pose*, Proc. of the NOBLESSE Workshop on Nonlinear Model Based Image Analysis, page 257-262, 1998.

Lee et al. *Realtime facial feature detection for person identification system*, IAPR Workshop on Machine Vision Applications, 2000.

Next, the positions of these points are compared to the projections of the vertices of the corresponding points of an example type of face, which in this case can be the template $S^0$ used for generating the three-dimensional model. This comparison is done by repeatedly modifying the pose of the facial template, by varying the parameters mentioned hereinabove, to minimise the difference between the projections of the vertices of the face of the individual and of the template in the following way:

$$\min_{s,a_x,a_y,a_z,t} \sum_{i=1}^{22} \|p_i - (s \cdot R \cdot v_i + t)\|^2$$

where $p_i$ is the position of a characteristic point i on the image and $v_i$ is a vertex of the corresponding point i of the template. As a function of the image of the relevant individual, which is non-frontal, some characteristic points can be invisible on the image or their position can be uncertain.

Therefore each characteristic point i is attributed a weighting coefficient $c_i$ representative of the "confidence" on the position of the point. If a point is invisible on the image, its confidence coefficient is zero.

The determination of the pose of the individual on the image is expressed as:

$$\min_{s,a_x,a_y,a_z,t} \sum_{i=1}^{22} c_i \|p_i - (s \cdot R \cdot v_i + t)\|^2$$

The pose obtained for the template on completion of minimisation constitutes the pose of the face of the individual on the image.

This problem of optimisation is resolved with a two-step procedure, the first step 310 being the linear search of a solution, and the second step being the non-linear minimisation 320 to refine the estimation of the pose obtained with the first step.

The step 310 of linear estimation will now be described.

This estimation starts out from the hypothesis that the distance between the positions of the characteristic points and the modelling of their projection, called the error of "retroprojection", is Gaussian with a zero average and a difference type equal to $$\frac{1}{\sqrt{c_i}},$$

and that if the error is inaependant for all points, it can be shown that the solution of the previous equation is also the solution of the following linear system:

$Ax = b$

With $$A = \begin{pmatrix} c_1 v_1^T & c_1 & 0^T & 0 \\ 0^T & 0 & c_1 v_1^T & c_1 \\ & & 0^T & 0 \\ c_2 v_2^T & c_2 & \dots & c_2 \\ c_{22} v_{22}^T & c_{22} & 0^T & 0 \\ 0^T & 0 & c_{22} v_{22}^T & c_{22} \end{pmatrix}$$

$x^T = (sr_{11} \quad sr_{12} \quad sr_{13} \quad t_x \quad sr_{21} \quad sr_{22} \quad sr_{23} \quad t_y)$ $b^T = (c_1 p_{x,1} \quad c_1 p_{y,1} \quad \dots \quad c_{22} p_{x,22} \quad c_{22} p_{y,22})$ Resolution of this overdetermined linear system is standard linear algebra and is done by using the pseudo-inverse given by singular value decomposition described in the publication Golub et al. *Matrix computations* volume 3, Johns Hopkins Univ Pr, 1996.

This first step of linear resolution 310 provides good starting estimation of the pose, but since the hypothesis adopted previously for linear resolution is not based on practice, the estimation needs to be refined by the non-linear estimation step 320.

The result of the linear step is refined by conducting a repeated non-linear step 320, for which a preferred method is Levenberg-Marquadt minimisation. Reference could be made to the publication Gill et al. *Practical Optimization*. Academic Press, London and New York, 1981.

This step finally produces a first estimation of the pose of the face of the individual on the image, this pose then being refined during the "flexible" estimation step 400 of the pose and of the shape of said face. It is considered therefore that at this stage a "draft" of the pose of the face has been determined.

The flexible estimation step 400 of the pose and of the shape will now be described. This estimation is carried out by the model of a three-dimensional face obtained at step 100. As indicated previously, this model is expressed as the shape of a linear combination of the template $S^0$ and the deviations of this template relative to the examples of individuals:

$$S = S^0 + \sum_{j=1}^{M} \alpha_j S^j$$

The shape of any face can be produced by selecting the coefficients $\alpha_i$ of the linear combination.

Flexible estimation of the shape and pose of the face of the individual on the image is therefore done by minimising the difference between the projections of the characteristic points $p_i$ of the face of the individual on the image, and the same projections of the model. To do this, the shape of the face obtained by the model (by way of the coefficients $\alpha_j$) and the pose parameters of the face are modified repeatedly.

Mathematically, the aim is therefore to produce the following minimum:

$$\min_{\alpha,s,a_x,a_y,a_z,t} \sum_{i=1}^{22} c_i \left\| p_i - \left( s \cdot R \cdot \left( S_i^0 + \sum_{j=1}^{M} \alpha_j S_i^j \right) + t \right) \right\|^2$$

But resolution of this equation could come out as a shape of the model of a deformed face which no longer corresponds to a human face. In fact, the characteristic points $p_i$ of the face of the individual can be noisy or inaccessible, and the system would not be fairly well determined.

The coefficients $\alpha_i$ are constrained to ensure producing a realistic human face. For this, the standard of the derivative of the deformation of the three-dimensional model is minimised, the deformed vertices of the model here being defined as a function of the vector a comprising the $\alpha_j$ for j of between 1 and M. The derivative of the deformation of the three-dimensional model is obtained by multiplication of the deformed model by a matrix A' constructed in the same way as the preceding differentiation matrix A.

This minimisation step corresponds to hypothesis of continuity of the face, which is verified irrespective of the individual and therefore allows the method to be as general as possible, that is, applicable for any individual.

The following equation therefore results:

$$\min_{\alpha, s, a_x, a_y, a_z, t} \sum_{i=1}^{22} c_i \left\| p_i - \left( s \cdot R \cdot \left( S_i^0 + \sum_{j=1}^{M} \alpha_j S_i^j \right) + t \right) \right\|^2 + \gamma \|A'S\alpha\|^2$$

This equation is resolved, similarly for the non-linear minimisation step, by using the Levenberg-Marquardt minimisation algorithm. The initialisation of the pose is provided by the pose obtained in terms of the rigid estimation step. The initial shape used for minimisation is that of the original template $S^0$, i.e. the values of the initial coefficients $\alpha_j$ are zero.

Figure 5B:
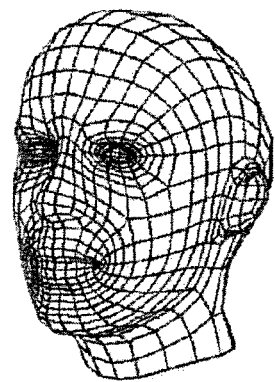
FIGS. 5b and 5c are respectively restitution of the shape of the face of the individual and a representation of the texture of said face.

Once this estimation is carried out, the three-dimensional deformed model therefore corresponds to the three-dimensional shape of the face of the individual on the image, shown in FIG. 5b. This three-dimensional shape can be manipulated simply to obtain a representation of a face.

Figure 5C:
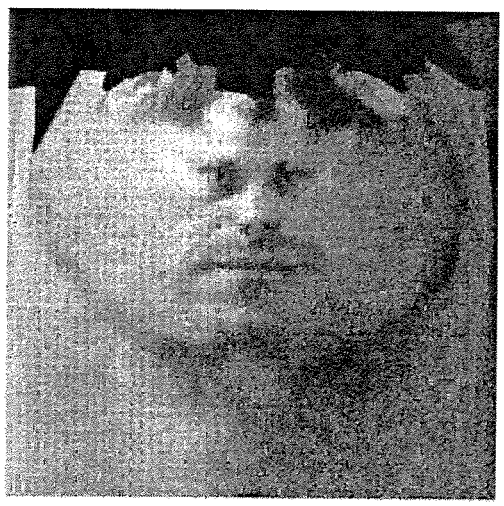

Also, from the three-dimensional shape and the original image, a representation of the texture of the face of the individual is generated during a step 500, shown in FIG. 5c. To do this, the original image is sampled at the positions of the points of the three-dimensional form.

Figure 5D:
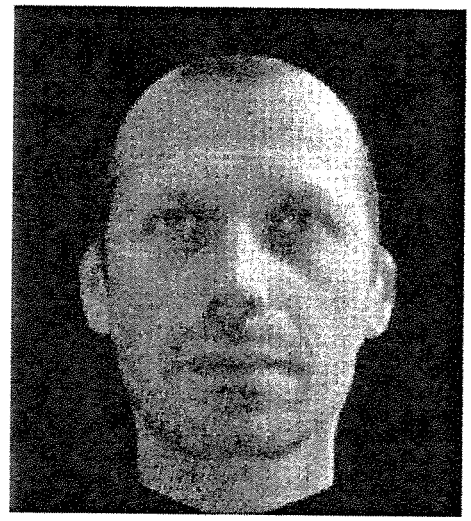

Finally during a step 600, a two-dimensional facial image of the individual, positioned in front view, is generated from the shape of the face, and the representation of the texture of the face. This image is illustrated in FIG. 5d. It can serve as a basis for a conventional identification method by facial recognition.

It is seen finally that this method can be carried out for a plurality of input images of the same individual to obtain a single three-dimensional shape of the face of the individual and a single representation of the texture of the face of the individual. However, a set of pose parameters must be estimated for each input image.

Linear and non-linear estimation steps 310 and 320 of the pose are conducted for each input image. Then the flexible estimation step 400 of the pose and of the shape is conducted on all the K images by searching for the following minimum:

$$\min_{\alpha, s_k, a_{x,k}, a_{y,k}, a_{z,k}, t_k} \sum_{k=1}^{K} \sum_{i=1}^{22} c_{i,k} \left\| p_{i,k} - \left( s_k \cdot R_k \cdot \left( S_i^0 + \sum_{j=1}^{M} \alpha_j S_i^j \right) + t_k \right) \right\|^2 +$$

$$\gamma \|AS\alpha\|^2$$

Then a representation of the texture of the face is extracted from each image, and as a function of the visibility of each element of the face on each input image, they are blended to produce a single representation of the texture of the face.

The new synthesis image is realised in the same way as previously for a single image.

Figure 6A:
FIGS. 6a and 6b are respectively input images of the same face and a facial image of the face obtained from these input images.
Figure 6A:
Figure 6B:
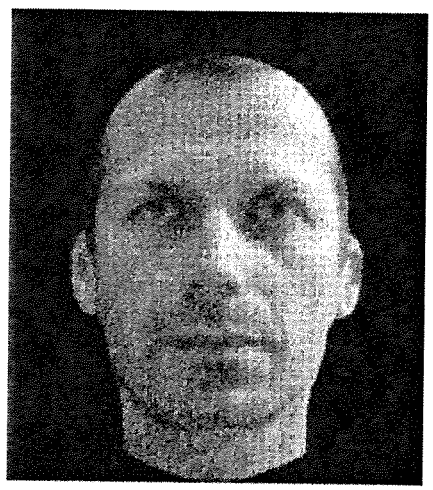

FIG. 6a shows two input images of the same individual, and FIG. 6b shows a facial image of the individual generated with this method.

The invention claimed is:

1. A method of fitting a three-dimensional deformable facial model to generate a three-dimensional representation of a face from at least one facial image of an individual, comprising:

acquiring a facial image corresponding to a non-frontal view of the individual, generating, from the image, a three-dimensional representation of the face of the individual, using a three-dimensional deformable facial model obtained from a facial template) ($S^0$), and from shapes of examples of faces of individuals ($S^0+S^j$), the examples of faces comprising one or more images of faces for each individual, said facial template comprising at least a thousand three-dimensional vertices and further comprising a surface defined by surface elements between the three-dimensional vertices, the three-dimensional deformable facial model being generated by repeatedly deforming, for each example of a face of an individual, the facial template ($S^0$) so that the shape of a deformed template corresponds to the shape of the example of a face, and determining a deformation ($S^j$) between the facial template and the deformed template, with the three-dimensional deformable facial model being obtained as a linear combination of a shape of the facial template ($S^0$) and of the deformations ($S^j$) between the facial template and the deformed template for each example of a face of an individual, the generation of the three-dimensional representation of the face comprising the steps of:

determining a shape and a pose of the face of the individual on the image by repeatedly deforming the three-dimensional deformable facial model, so that the shape of the three-dimensional deformable facial model after deformation corresponds to the shape of the face of the individual on the acquired image, wherein fitting of the three-dimensional deformable facial model is carried out by modification of the coefficients of the linear combination of the deformed three-dimensional deformable facial model, said modifications being constrained by minimisation of the standard of the derivative of the difference between the facial template and the deformed three-dimensional deformable facial model, in order to ensure that the deformed three-dimensional deformable facial model remains the shape of a human face, the derivative of the difference between the facial template and the deformed three-dimensional deformable facial model being calculated as a sum of derivatives of deformations for each surface element of the surface of the facial template, wherein said derivative of deformation for said surface element is obtained as a function of a difference of a displacement of said surface element with respect to displacements of surface elements which are adjacent to said surface element, and from the estimation of the pose and of the shape of the face of the individual on the image, generating a representation of the texture of the face of the individual, generating a frontal view of the face of the individual.

2. The processing method according to claim 1, wherein the pose and the shape of the face of the individual on the image are simultaneously estimated, by repeated modification of the pose and of the shape of the three-dimensional deformable facial model to minimise the difference between the characteristic points of the face of the individual on the image and the corresponding points of the three-dimensional deformable facial model.

3. The processing method according to claim 2, wherein the modification of the pose of the three-dimensional deformable facial model comprises at least one transformation from the following group: translation, rotation, and change in scale.

4. The processing method according to claim 3, wherein the modification of the shape of the three-dimensional deformable facial model comprises the determination of the coefficients of the linear combination between the facial template and the deformations applied to the template to obtain each example of a face.

5. The processing method processing method according to one of claim 2, 3, or 4, carried out on a plurality of face images of individuals, and wherein:
   the step for determination of a draft of the pose of the face of the individual is carried out on each facial image of the individual, and
   the step for determination of the shape and the pose of the face of the individual is carried out on all the face images by repeatedly deforming the three-dimensional deformable facial model so that the shape of the deformed model corresponds to the shape of the face of the individual on the images.

6. The processing method according to claim 1, wherein, for the fitting of the three-dimensional deformable facial model, the derivative of the deformation for each surface element is calculated as a function of a displacement of a barycentre of said surface element between the deformed model and the facial template.

7. A system for identification of individuals, comprising at least one control server (SC) of an individual (I) to be identified, and at least one management server (SG) of a database (DB) of N reference images of indexed individuals,
   the control server (SC) comprising a camera adapted to perform acquisition of an image of the face of the individual (I),
   the system for identification of individuals being characterized in that either of the control server (SC) and the management server (SG) is configured to perform the processing method according to claim 1, and, from a frontal view of the face of an individual obtained, to perform processing of facial recognition by comparison with the reference images of the database, to identify the individual.

* * * * *